(12) United States Patent  (10) Patent No.: US 8,578,291 B2
Park et al.  (45) Date of Patent: Nov. 5, 2013

(54) METHOD FOR SETTING IMAGE IN TERMINAL AND TERMINAL USING THE SAME

(75) Inventors: Jun Serk Park, Seoul (KR); Choon Jae Lee, Gwangju (KR); Hye Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1039 days.

(21) Appl. No.: 12/033,773

(22) Filed: Feb. 19, 2008

(65) Prior Publication Data

US 2008/0201660 A1  Aug. 21, 2008

(30) Foreign Application Priority Data

Feb. 20, 2007 (KR) .................. 10-2007-0017064

(51) Int. Cl.
*G06F 3/048* (2013.01)

(52) U.S. Cl.
USPC .......................................... 715/781; 715/764

(58) Field of Classification Search
USPC .......................................... 715/781, 863, 864
See application file for complete search history.

(56) References Cited

U.S. PATENT DOCUMENTS

| | | | | |
|---|---|---|---|---|
| 5,519,485 A * | 5/1996 | Ohtani et al. | ...................... | 356/2 |
| 5,909,543 A * | 6/1999 | Tanaka et al. | .................. | 709/204 |
| 6,170,014 B1 * | 1/2001 | Darago et al. | ................. | 709/229 |
| 6,750,830 B1 * | 6/2004 | Teshima et al. | ................. | 345/1.2 |
| 6,931,422 B1 * | 8/2005 | Gusler et al. | ........................... | 1/1 |
| 2005/0250548 A1 * | 11/2005 | White | ........................... | 455/566 |
| 2006/0119709 A1 * | 6/2006 | Morimoto | ................. | 348/207.99 |
| 2006/0146065 A1 * | 7/2006 | Wada | ............................. | 345/590 |
| 2006/0217160 A1 * | 9/2006 | Lee | ................................. | 455/566 |
| 2007/0152957 A1 * | 7/2007 | Shibata | .......................... | 345/156 |
| 2007/0243928 A1 * | 10/2007 | Iddings | ............................. | 463/26 |
| 2007/0294616 A1 * | 12/2007 | Kizaki | ............................. | 715/526 |
| 2008/0004082 A1 * | 1/2008 | Bloebaum | ........................ | 455/566 |
| 2008/0126846 A1 * | 5/2008 | Vivian et al. | ........................ | 714/6 |
| 2008/0231546 A1 * | 9/2008 | Li | ................................. | 345/3.4 |
| 2010/0064168 A1 * | 3/2010 | Smoot et al. | ........................ | 714/6 |

FOREIGN PATENT DOCUMENTS

JP  2003-224628 A  8/2003

OTHER PUBLICATIONS

Yahoo Home Page dated Jan. 30, 2006; last accessed from http://web.archive.org/web/20060130145509/http://www.yahoo.com/ on Jul. 29, 2011.*

* cited by examiner

*Primary Examiner* — Tuyetlien Tran
*Assistant Examiner* — Jessica Chuang
(74) *Attorney, Agent, or Firm* — Birch, Stewart, Kolasch & Birch, LLP

(57) ABSTRACT

A method for setting an image in a terminal and a terminal using the same are disclosed. The image setting method includes according to an embodiment displaying a list of one or more files settable as an image of the second display, on the first display; moving an indicator to indicate one of the one or more files on the displayed list; and displaying data contained in the indicated one file, on the second display.

4 Claims, 10 Drawing Sheets

METHOD FOR SETTING IMAGE IN TERMINAL AND TERMINAL USING THE SAME

This application claims the priority benefit of Korean Patent Application No. 10-2007-0017064, filed on Feb. 20, 2007, which is hereby incorporated by reference as if fully set forth herein.

BACKGROUND OF THE INVENTION

1. Field of the Invention

The present invention relates to a method for setting an image in a terminal and a terminal using the same.

2. Discussion of the Related Art

In general, a single display or dual display is used as a display for a terminal. The dual display consists of a main display and a sub-display.

Such a terminal with the dual display displays information related thereto and a function control process thereof through the main display, and displays a preset image or brief status information related to the terminal through the sub-display.

Particularly, in a process of setting an image of the sub-display, the terminal displays an image necessary for the image setting of the sub-display on the main display and sets the image of the sub-display using the displayed image.

However, in the above-mentioned terminal, even in the case where the image of the sub-display is set on the main display, it is impossible to display the sub-display image setting process on the sub-display.

Further, in the terminal according to the related art, it is impossible to perform the image setting of the main display and the image setting of the sub-display at the same time, thereby making the image setting process complex and troublesome.

SUMMARY OF THE INVENTION

Accordingly, the present invention is directed to a method for setting an image of a terminal and a terminal using the same that substantially obviate one or more problems due to limitations and disadvantages of the related art.

An object of the present invention is to provide a method for setting an image of a terminal with a plurality of displays, and a terminal using the method, wherein where an image of a second one of the displays is set on a first one of the displays, a process of setting the image of the second display can be displayed on the second display.

Another object of the present invention is to provide a method for setting an image of a terminal with a plurality of displays wherein an image of a first one of the displays and an image of a second one of the displays can be set on one image on the first display, and to provide a terminal using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for setting an image in a terminal with a plurality of displays according to an embodiment comprises: displaying a list of one or more files settable as an image of a second one of the displays on a first one of the displays; moving an indicator indicating one of the one or more files on the displayed list; and displaying data contained in one of the one or more files where the indicator is located, on the second display.

In another aspect of the present invention, a method for setting an image in a terminal with a plurality of displays comprises: displaying a first list of one or more files settable as an image of a first one of the displays and a second list of one or more files settable as an image of a second one of the displays on the first display; moving an indicator indicating one of the one or more files on at least one of the first list and the second list; and displaying data contained in one of the one or more files where the indicator is located, on the first display.

In yet another aspect of the present invention, a terminal with an image setting function comprises: an input unit; a display unit including a plurality of displays; and a controller configured to control a first one of the displays to display a list of one or more files settable as an image of a second one of the displays, and move an indicator indicating one of the one or more files on the displayed list in response to an input signal from the input unit.

The display unit may display data contained in one of the one or more files where the indicator is located, on the second display, in response to a control signal from the controller.

According to one aspect, the present invention provides a method for setting an image in a terminal with at least a first display and a second display, comprising displaying a list of one or more files settable as an image of the second display, on the first display; moving an indicator to indicate one of the one or more files on the displayed list; and displaying data contained in the indicated one file, on the second display.

According to another aspect, the present invention provides a method for setting an image in a terminal with at least a first display and a second display, comprising displaying, on the first display, a first list of one or more files settable as an image of the first display and a second list of one or more files settable as an image of the second display, moving an indicator for indicating one of the one or more files on at least one of the first list and the second list, and displaying data contained in one of the one or more files where the indicator is located, on the first display.

According to another aspect, the present invention provides a terminal with an image setting function, comprising an input unit, a display unit including at least a first display and a second display, and a controller configured to control the first display to display a list of one or more files settable as an image of the second display, and to move an indicator to indicate one of the one or more files on the displayed list in response to an input signal from the input unit, wherein the display unit displays data contained in the indicated one file, on the second display, in response to a control signal from the controller.

According to another aspect, the present invention provides a mobile terminal comprising a first display screen configured to display first and second windows simultaneously, wherein the first window displays a first list of images for a user's selection and at the same time displays an image selected from the first list, and wherein the second window displays a second list of images for the user's selection and at the same time displays an image selected from the second list; a second display screen configured to display the image selected from the second list, at the same time the second window of the first display screen displays the same image selected from the second list; and a controller to control the first and second display screens.

According to another aspect, the present invention provides a mobile terminal comprising: a first display screen configured to display one list of files for both the first display screen and a second display screen, and to display first and second selection indicators for indicating whether or not a particular file on the list has been selected respectively for the first and second display screens, wherein the first display screen includes first and second windows for displaying therein images associated respectively with the first and second display screens according to the first and second selection indicators; the second display screen configured to display the same image displayed in the second window; and a controller to control the first and second display screens.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the invention rather unclear.

Figure 1:
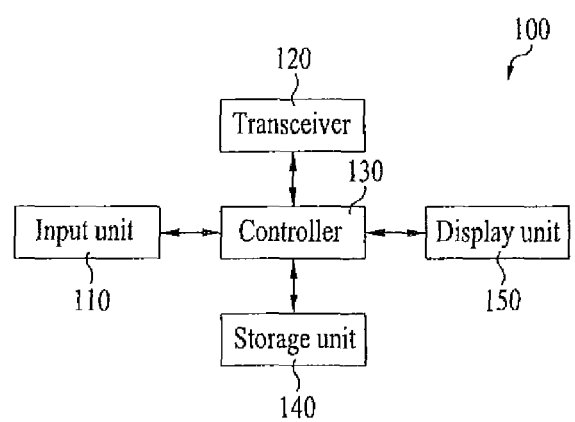
FIG. 1 is a block diagram showing an exemplary embodiment of a terminal with an image setting function according to the present invention.

A terminal with an image setting function according to an embodiment of the present invention will hereinafter be described in detail with reference to FIG. 1. FIG. 1 is a block diagram showing an exemplary embodiment of the terminal with the image setting function according to the present invention.

As shown in FIG. 1, the terminal 100 according to the present embodiment comprises an input unit 110, a transceiver 120, a controller 130, a storage unit 140, and a display unit 150. The terminal 100 may include other known components, and all components of the terminal 100 are operatively coupled and configured.

The input unit 110 receives an input operation from a user of the terminal 100 and generates a signal corresponding to the received input operation. The transceiver 120 transmits/receives a radio frequency signal to/from an external terminal or server over a wired/wireless communication network or broadcast network. The controller 130 controls the entire operation of the terminal 100. The controller 130 also controls the respective components 110, 120, 140 and 150 such that they can perform given operations. The storage unit 140 stores, not only all data inputted/outputted to/from the terminal, but also all programs necessary to the operations of the respective components 110, 120, 130, 140 and 150. The display unit 150 displays various data related to the terminal 100.

Particularly, the display unit 150 includes a plurality of displays, and examples of the displays are LCD displays, OLED displays, etc. For the convenience of description, it will hereinafter be assumed that two displays, a first display and a second display, are provided in the display unit 150. However, the display unit 150 may include any number of displays.

Figure 8:
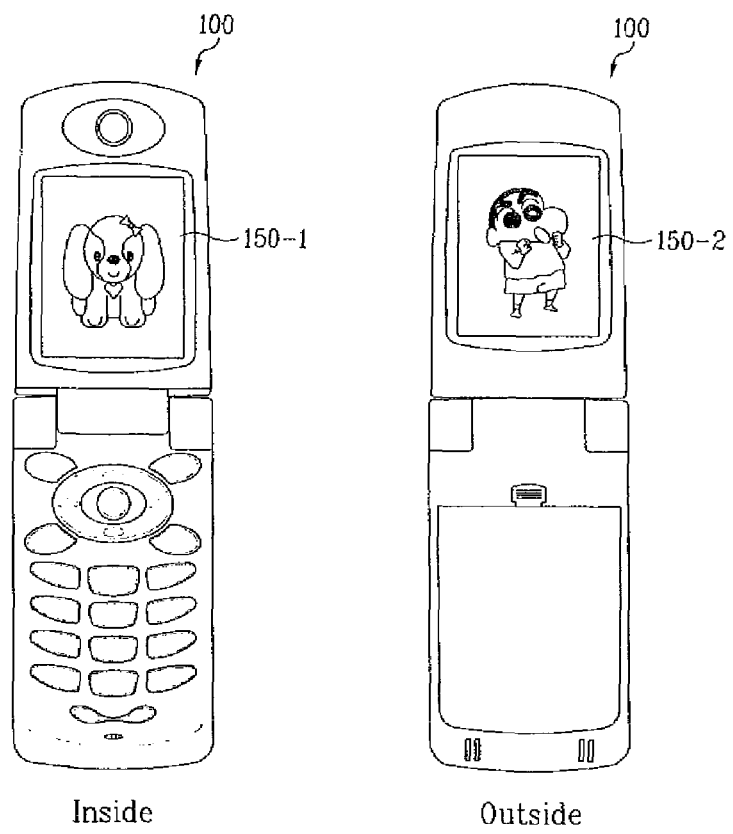
FIG. 8 is a view showing examples of the front and rear sides of a terminal to which the present invention is applied, when the terminal is in an open state.

For example, as shown in FIG. 8, the first and second displays, denoted respectively by reference numerals 150-1 and 150-2, may be positioned respectively on the front and rear sides (or rear and front sides) of one body such that they are opposite to each other.

In other examples, although not shown, the first and second displays may be positioned on the same side of one body constituting the terminal 100, or respectively on the front or rear sides of upper and lower bodies constituting the terminal 100.

Figure 4A:
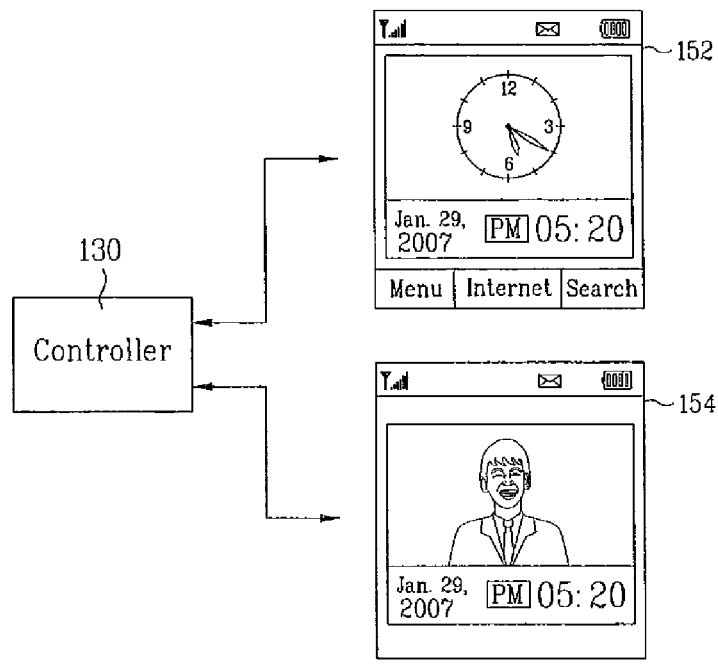
FIGS. 4A and 4B are views showing examples of images set in first and second displays according to the present invention.
Figure 4B:
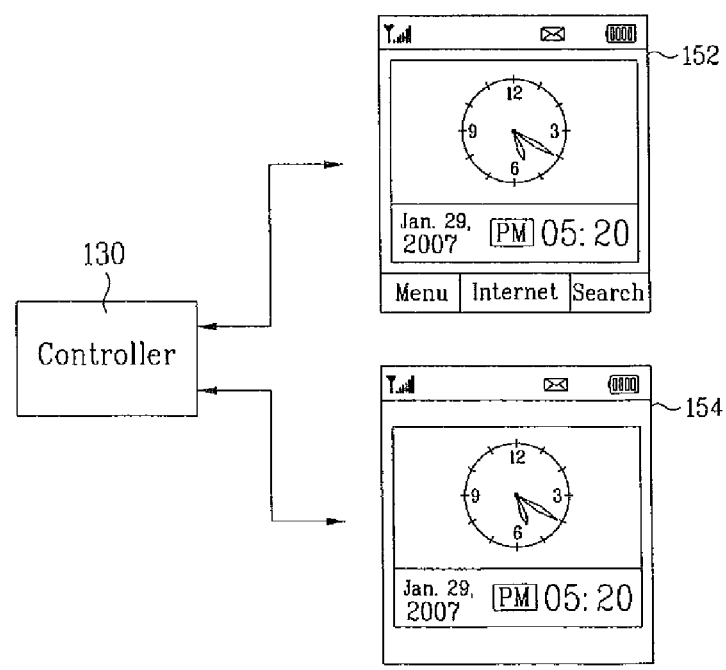

Further, the first and second displays may display different images as shown in FIG. 4A or the same image as shown in FIG. 4B in response to control signals from the controller 130.

For example, when a specific key provided in the terminal 100 is selected while the first and second displays are currently displaying different images 152 and 154, the second display may display the same image 152 as that of the first display as shown in FIG. 4B. Alternatively, although not shown, when the specific key is selected, the first display may display the same image 154 as that of the second display.

A first embodiment of a display image setting method of the terminal according to the present invention will hereinafter be described in detail with reference to FIG. 1 and FIG. 2.

Figure 2:
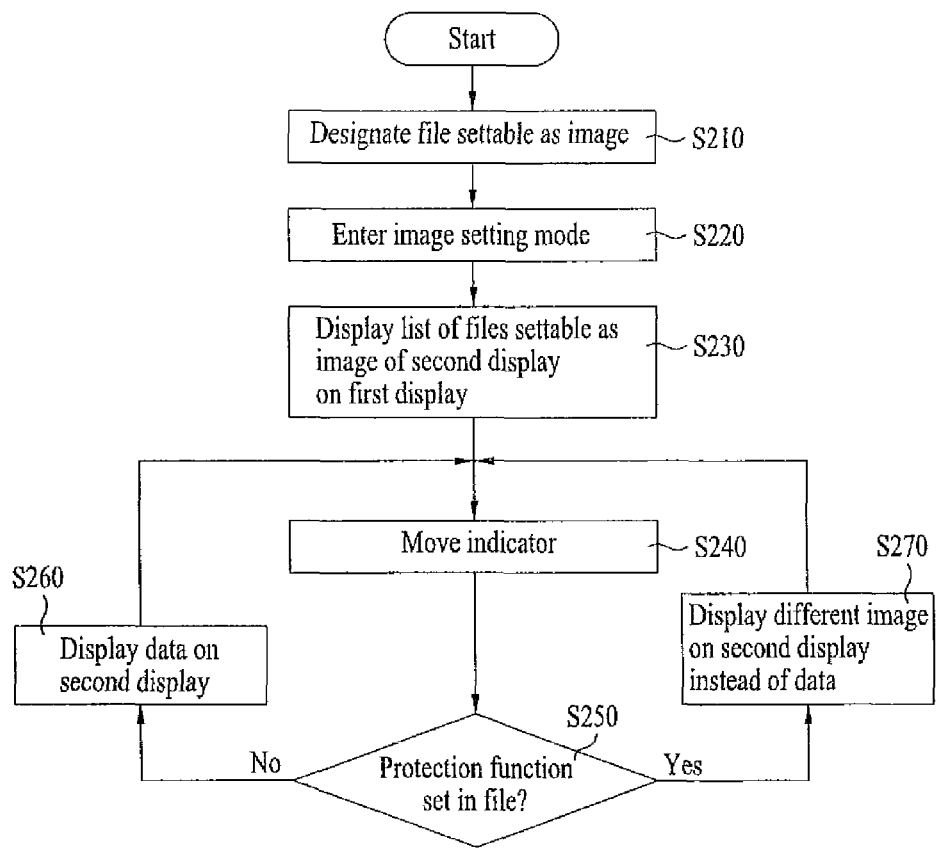
FIG. 2 is a flowchart illustrating a first embodiment of an image setting method according to the present invention.

FIG. 2 illustrates a process of setting an image of the second display among the first and second displays provided in the terminal according to the present invention. Also, this and other processes of the present invention are implemented by the terminal 100, but can be implemented by other suitable devices. Here, this and other processes discussed herein according to the various embodiments are not limited to the first and second displays 150-1 and 150-2 of FIG. 8, and is applicable to any first and second displays of the display unit 150 regardless of their positioned locations.

The controller 130 designates at least one file settable as an image of the first or second display in response to a selection signal from the user inputted trough the input unit 110 (S210).

Here, the file settable as the image may include a still image file, a moving image file, a text file, a flash file, or the like.

For example, the controller 130 may designate the at least one file settable as the image with respect to each of the first and second displays. At this time, the file to be designated may be pre-stored in the storage unit 140 or provided from an external terminal or server through the transceiver 120.

Also, the user may select the at lest one file to be designated, using direction keys, number keys, a scroll key, etc. provided in the input unit 110. At this time, the direction keys may be provided on a key pad or touch pad. Alternatively, in the case where a touch screen is provided in the input unit 110, the user may select the file to be designated, by touching a specific file among a plurality of files displayed on the touch screen.

The controller 130 enters a mode ('image setting mode') for setting the image of the second display, in response to a selection signal from the user inputted through the input unit 110 (S220).

Entering the image setting mode for the second display, the controller 130 sets a state for the image setting of the second display.

The display unit 150 displays a list of one or more files settable as the image of the second display, on the first display in response to a control signal from the controller 130 (S230).

Here, the list may be configured in a text format or thumbnail format. Also, the list may provide a file name, a file format, a file capacity, protection function setting/non-setting, etc. as information about each of the files constituting the list. In particular, where the list is configured in the thumbnail format, it may briefly provide data contained in the files.

The controller 130 moves an indicator indicating one of the one or more files on the displayed list (S240).

Here, the indicator can be any means for indicating a file currently selected by the user, e.g., a highlight, cursor, or the like. With this indicator, the user can easily see which file is currently selected by him.

For example, where the user selects a 'fifth file' by moving from a 'first file' to the 'fifth file', the indicator is moved from the 'first file' to the 'fifth file'.

The controller 130 determines whether there is a protection function set in a file where the indicator is located (S250).

Here, the protection function preferably means a function of preventing data contained in a file from being externally exposed. As a result, data contained in a file set to the protection function cannot be displayed on the first and/or second display as long as the protection function is not released.

Hence, for example, when there is no protection function set in the file where the indicator is located, the display unit 150 can display data contained in that file on the first or second display, or both.

On the other hand, for example, because the first display may be provided to only the user, as shown in FIG. 8, the data contained in the file where the indicator is located may be displayed on a portion of the first display even in the case where the protection function is set in that file.

If it is determined that there is no protection function set in the file where the indicator is located, the display unit 150 displays the data contained in that file on the second display (S260). For example, when the data contained in the file where the indicator is located is a 'still image' or 'moving image', the display unit 150 displays the 'still image' or 'moving image' on the second display. Alternatively, when the data contained in the file where the indicator is located is a 'text' or 'flash', the display unit 150 displays the 'text' or 'flash' on the second display.

In the case where it is determined in step S250 that there is a protection function set in the file where the indicator is located, the display unit 150 displays a different image on the second display, instead of the data contained in that file (S270). That is, the data contained in the selected file is protected and is not displayed on the second display according to the protection function. For example, the display unit 150 may display on the second display, as the different image, a preset image or data contained in a file where the indicator was just previously located.

A second embodiment of the display image setting method/process of the terminal according to the present invention will hereinafter be described in detail with reference to FIG. 1 and FIG. 3.

Figure 3:
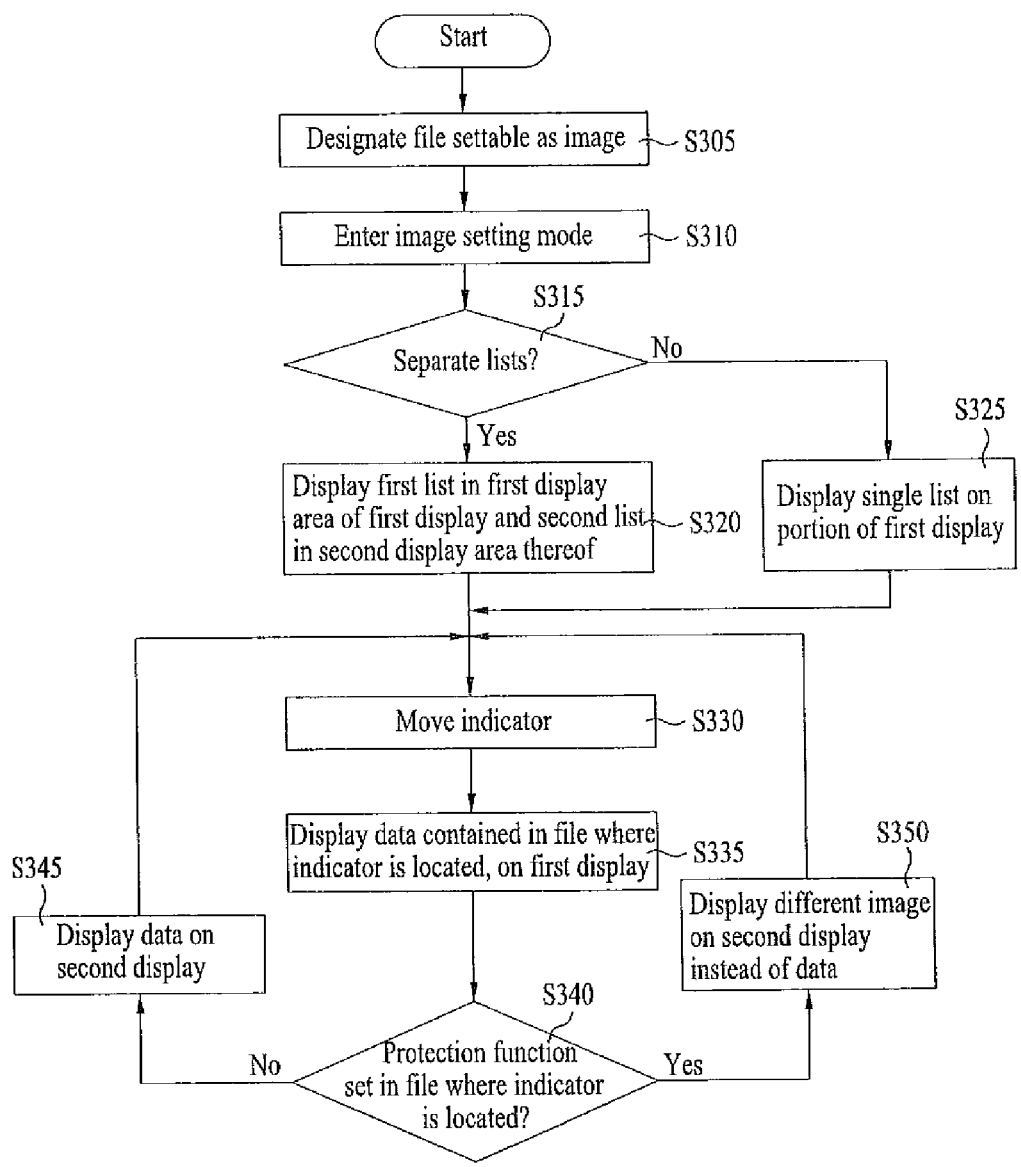
FIG. 3 is a flowchart illustrating a second embodiment of the image setting method according to the present invention.

FIG. 3 illustrates a process of setting images of the first and second displays provided in the terminal according to the present invention.

The controller 130 designates at least one file settable as an image of the first or second display in response to a selection signal from the user inputted through the input unit 110 (S305). For example, the controller 130 may designate at least one file settable as the image with respect to each of the first and second displays. Alternatively, the controller 130 may designate a file settable as a common image of the first and second displays.

The controller 130 enters a mode ('image setting mode') for setting the image of at least one of the first and second displays, in response to a selection signal from the user inputted through the input unit 110 (S310). For example, the controller 130 may enter the image setting mode for any one of a first display and a second display of the terminal, according to the user's selection.

Hereinafter, the image setting method will be described in connection with only the case where the controller 130 enters the image setting mode for the first/second display.

The controller 130 determines whether a list ('first list') of one or more files settable as the image of the first display and a list ('second list') of one or more files settable as the image of the second display are separate lists (S315).

If the first list and the second list are determined to be separate lists, the display unit 150 distinguishably displays the first list and the second list on different areas of the first display in response to a control signal from the controller 130 (S320). For example, the first display may include a plurality of display areas, and display the first list in a first one of these display areas and the second list in a second one of these display areas.

On the other hand, in the case where it is determined that the first list and the second list are not separate lists, namely, the first list and the second list constitute a single list, the display unit 150 displays the single list on a portion of the first display (S325). For example, the single list may include one or more files settable as the respective images of the first and second displays. In this case, the single list may also indicate whether each file is designated as a file settable as an image of the first and/or second displays.

The controller 130 moves an indicator indicating one of the one or more files displayed on at least one of the displayed first and second lists (S330). On the other hand, the controller 130 may move an indicator indicating one of the one or more files on the displayed single list (S330). For example, where the first and second lists are separate lists, respective indicators may be displayed with respect to the first and second lists. The controller 130 may move the respective indicators for the first and second lists in response to selection signals from the user.

Here, the indicator movement may be carried out using input means provided in the input unit 110, such as direction keys, number keys, a scroll key, touch-sensitive screen, etc.

Further, the respective indicators for the first and second lists may be moved through different input means.

The display unit 150 displays data contained in file(s) where the indicator(s) is located, on the first display (S335).

At this time, the display step S335 may be carried out irrespective of whether there is a protection function set in the file(s) where the indicator(s) is located.

For example, the first display may include a plurality of display areas, and may display data of a file on the first list where the indicator is located, in a third one of these display areas, and may display data of a file on the second list where the indicator is located, in a fourth one of these display areas.

The controller 130 determines whether there is a protection function set in the file on the second list where the indicator is located (S340). On the other hand, the controller 130 may determine whether there is a protection function set in the file, among the at least one file settable as image of the second display, on the single list where the indicator is located (S340). Here, the protection function preferably means a function of preventing data contained in a file from being externally exposed or displayed.

If it is determined that there is no protection function set in or for the file where the indicator is located, the display unit 150 displays the data contained in that file on the second display (S345).

In the case where it is determined that there is a protection function set in or for the file where the indicator is located, the display unit 150 displays a different image on the second display, instead of the data contained in that file (S350).

Various examples of an image setting process for the second display according to the present invention will hereinafter be described in detail with reference to FIGS. 5A to 5D.

The first display is denoted by reference numeral 510, and the second display is denoted by reference numeral 550. The first and second displays 510 and 550 can be disposed on inner and outer sides of the terminal, respectively, or on one same side of the terminal.

Figure 5A:
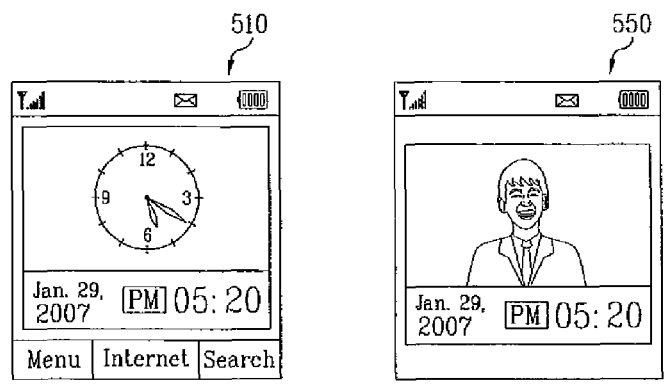
FIGS. 5A to 5D are examples of state diagrams illustrating a first embodiment of a display image setting process according to the present invention.

The first and second displays 510 and 550 display preset images, respectively, as shown in FIG. 5A.

Figure 5B:
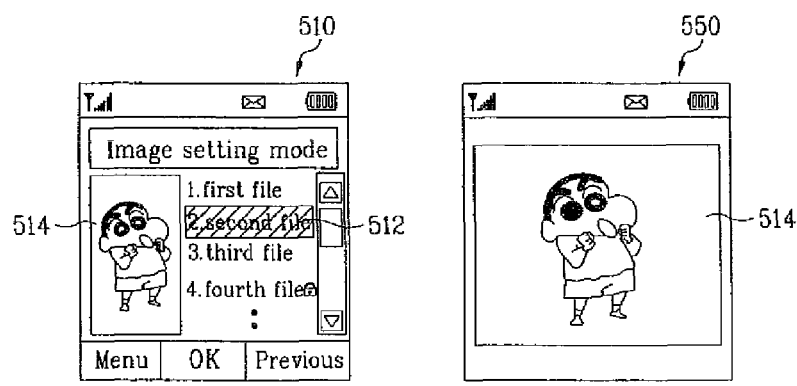

As the second display image setting mode is entered, the first display 510 displays a list of files settable as an image of the second display 550 in a first area of the first display 510, as shown in FIG. 5B. As the user moves to a second file 512 on the displayed list using the indicator, data 514 of the second file 512 on the list where the indicator is located is displayed in a second area of the first display 510, as shown in FIG. 5B. At this time, the second display 550 displays the data 514 of the second file 512 where the indicator is located, at the same time that the first display 510 displays that data 514 as shown in FIG. 5B.

Figure 5C:
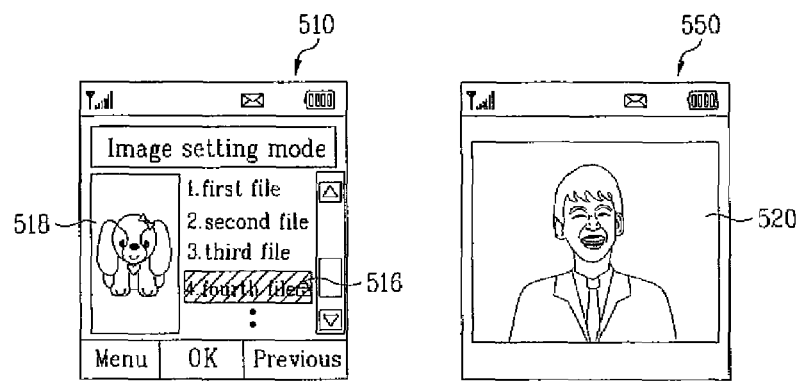

As the indicator is moved, the first display 510 displays data 518 of a fourth file 516 where the indicator is now located, in its second area, as shown in FIG. 5C.

On the other hand, if a protection function is set in or for the fourth file 516 (as an example), the second display 550 displays a preset image 520 instead of the data 518 contained in the fourth file 516 as shown in FIG. 5C.

Figure 5D:
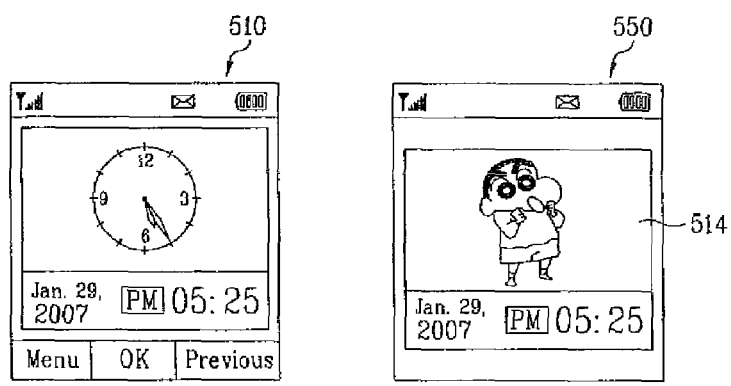

Thereafter, if the second file 512 is selected again through the above image setting process, then the second display 550 sets and displays the data 514 contained in the second file 512 as the image thereof, as shown in FIG. 5D. In this example, the image 514 of the second file 512 is displayed on the second display 550 since the protection function for the second display is not set. After the second display image setting process is finished, the first display 510 can display back its menu/standard image as shown in FIG. 5D.

An image setting process for the first/second display according to the present invention will hereinafter be described in detail with reference to FIGS. 6A to 6C.

Figure 6A:
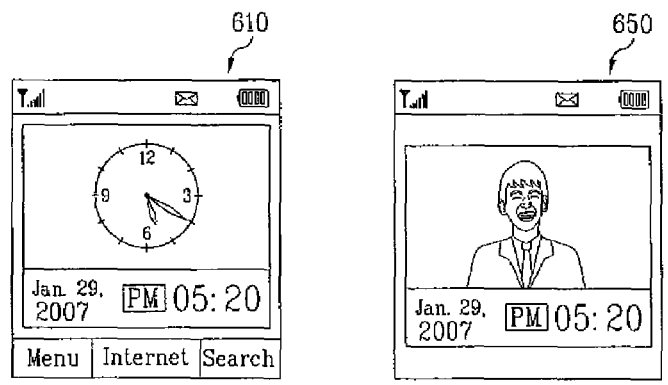
FIGS. 6A to 6C are examples of state diagrams illustrating a second embodiment of the display image setting process according to the present invention.
Figure 6B:
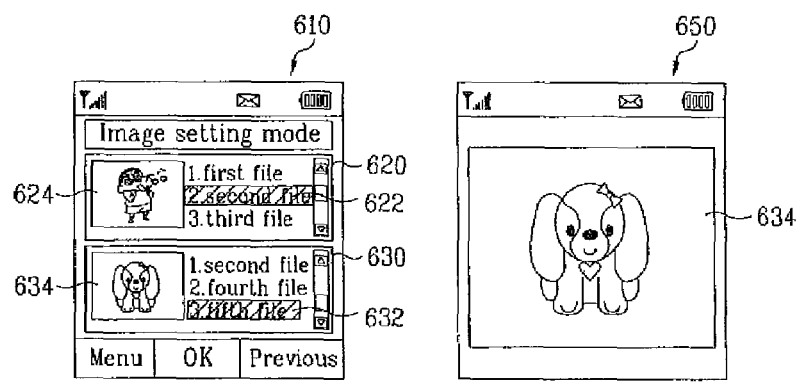
Figure 6C:
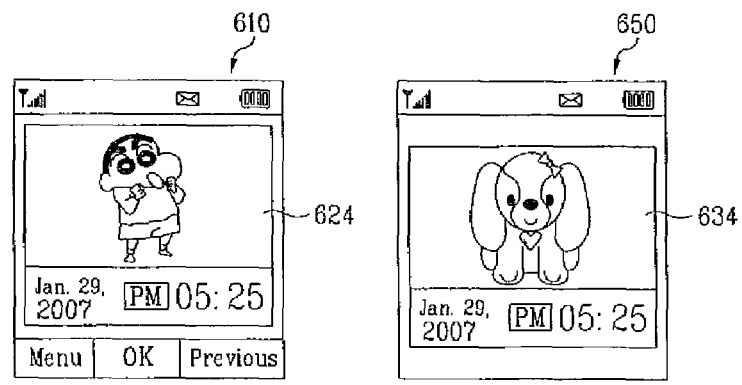

FIGS. 6A to 6C show the case where a list ('first list') of files settable as an image of the first display, denoted by reference numeral 610, and a list ('second list') of files settable as an image of the second display, denoted by reference numeral 650 are separate lists.

The first display 610 and the second display 650 display preset images, respectively, as shown in FIG. 6A.

As the first/second display image setting mode is entered, the first display 610 displays a window ('first window') 620 for the image setting of the first display 610 and a window ('second window') 630 for the image setting of the second display 650 in its respective display areas, as shown in FIG. 6B.

In more detail as shown in FIG. 6B, the first display 610 displays the first list in a first display area in the first window 620, and displays data 624 of a second file 622 displayed on the first list where the indicator is located, in a second display area in the first window 620. Also, the first display 610 displays the second list in a third display area in the second window 630, and displays data 634 of a fifth file 632 on the second list where the indicator is located, in a fourth display area in the second window 630.

At this time, the second display 650 displays the same data (image) 634 of the fifth file 632 on the second list (for the second display) where the indicator is located, at the same time that the first display 610 displays the same data 634 in the second window 630.

Then, the first and second displays 610 and 650 set and display the data 624 and 634 contained respectively in the second file 622 and fifth file 632 selected though the above image setting process as the respective images thereof, as shown in FIG. 6C.

An image setting process for the first/second display according to another example of the present invention will hereinafter be described in detail with reference to FIGS. 7A to 7D.

FIGS. 7A to 7D show the case where a list ('first list') of files settable as an image of the first display, denoted by reference numeral 710, and a list ('second list') of files settable as an image of the second display, denoted by reference numeral 750, constitute a single list.

Figure 7A:
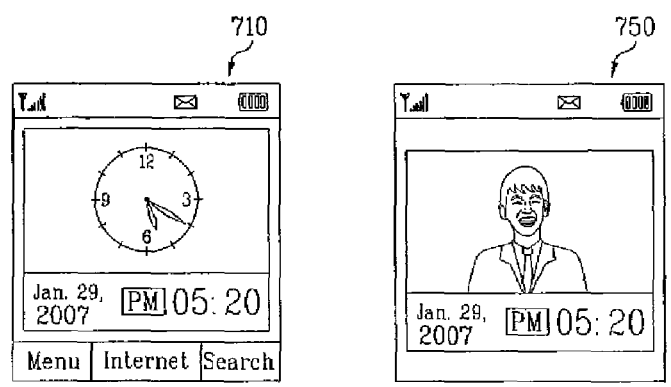
FIGS. 7A to 7D are examples of state diagrams illustrating a third embodiment of the display image setting process according to the present invention.

The first display 710 and the second display 750 display preset images, respectively, as shown in FIG. 7A.

Figure 7B:
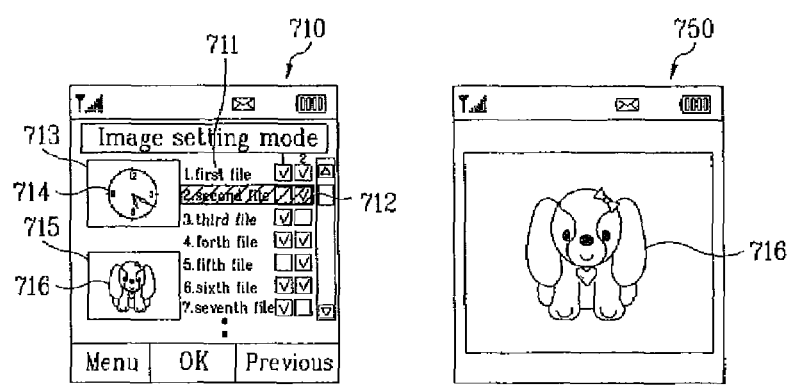

As the first/second display image setting mode is entered, the first display 710 displays an integrated list including the first and second lists in a first display area 711, as shown in FIG. 7B. At this time, in this example, the integrated list provides, at the end of the name of each file, information (e.g., box 1 and box 2) indicative of whether each file is designated as a file settable as an image of which one of the first and second displays 710 and 750.

For example, where a 'box 1' and a 'box 2' displayed at the end of the name of a specific file are both checked, the corresponding specific file is designated as a file settable as the image of both the first and second displays 710 and 750. Alternatively, the specific file is designated as a file settable as the image of only the first display 710 in the case where only the 'box 1' is checked, and as a file settable as the image of only the second display 750 in the case where only the 'box 2' is checked.

As a result, the first display 710 displays data of a file with the 'box 1' checked where the indicator is located, in a second display area 713, and displays data of a file with the 'box 2' checked where the indicator is located, in a third display area 715, as shown in FIG. 7B.

For instance, where the indicator is located in a second file 712 with only the 'box 2' checked, the first display 710 displays an image 714 preset therefor (and not data of the second file 712) in the second display area 713, and displays data 716 of the second file 712 in the third display area 715, as shown in FIG. 7B.

At this time, the second display 750 displays the data 716 of the second file 712 selected on the integrated list by the location of the indicator, at the same time that the first display 710 displays the same data 716 as shown.

Figure 7C:
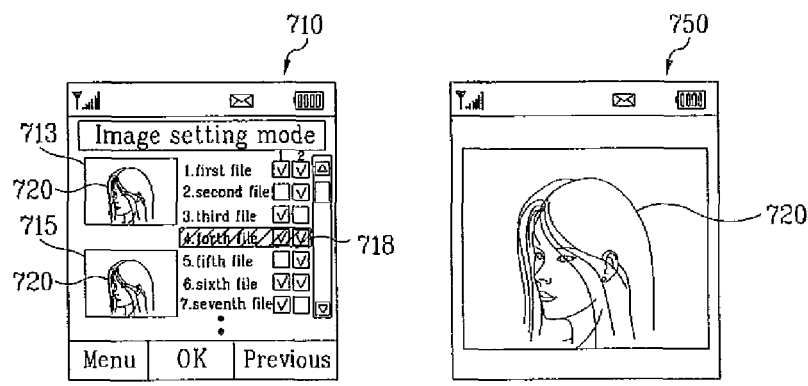

Alternatively, where the indicator is located in a fourth file 718 with both the 'box 1' and 'box 2' checked, the first display 710 displays data 720 of the fourth file 718 in the second and third display areas 713 and 715, as shown in FIG. 7C.

At this time, the second display 750 displays the data 720 of the selected fourth file 718 on the integrated list where the indicator is located, at the same time that the first display 710 displays the data 720 as shown.

Figure 7D:
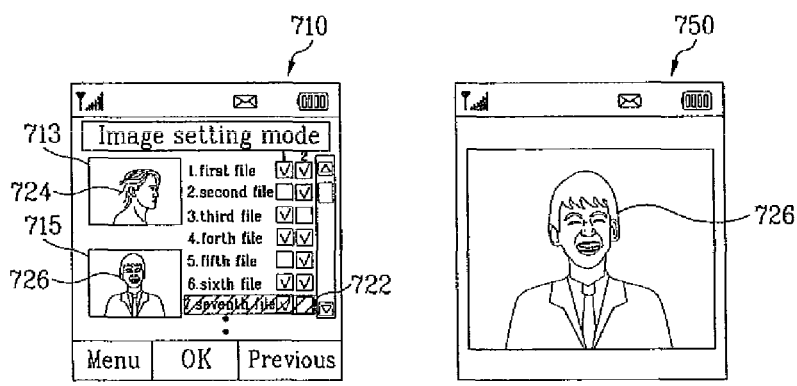

In another example, where the indicator is located in a seventh file 722 with only the 'box 1' checked, the first display 710 displays data 724 of the seventh file 722 in the second display area 713, and displays an image 726 preset (not the data 724) for the second display 750 in the third display area 715, as shown in FIG. 7D. As a result, the image 726 is displayed on the second display 750.

As apparent from the above description, according to the present invention, in a terminal with a plurality of displays, where an image of a second one of the displays is set on a first one of the displays, an operation of setting the image of the second display can be performed and displayed on the first display.

Further, images of the first and second displays can be controlled and set to be one image on the first display.

Moreover, a user can easily select and preview data/image to be displayed on each of a plurality of displays of a terminal. The user can also easily and selectively prevent displaying of certain data on any one of the displays.

It will be apparent to those skilled in the art that various modifications and variations can be made in the present invention without departing from the spirit or scope of the inventions. For instance, the present invention is not limited to setting an image display for displays, but is applicable to setting any other types of data/information display for the displays of the terminal. The terminal can be, e.g., a mobile phone, a PDA, a computer laptop, a smart phone, or any device that has at least two displays. Thus, it is intended that the present invention covers the modifications and variations of this invention provided they come within the scope of the appended claims and their equivalents.

What is claimed is:

1. A method for setting an image in a mobile terminal with at least a first display and a second display, the method comprising:
    entering a mode for setting a background screen image of one of the first display and the second display, the first display located on a front side of a body of the terminal and the first display displaying information that is provided to only a user of the terminal, and the second display located on a rear side of the body of the terminal;
    displaying a list of image files settable as the background screen image of the first display and the second display, on the first display, the image files being stored in a storage unit of the mobile terminal, the first display having a plurality of display areas, including a first display area and a second display area;
    displaying an indication information whether each image file on the list is designated as an image file settable as a background screen image of one of the first display and the second display, at the end of the name of each image file on the list;
    moving an indicator to indicate one of the image files on the list;
    determining whether the indicated image file on the list is designated as an image file settable as a background screen image for the first display;
    displaying an image data contained in the indicated image file in the first display area if the indication information is designated for the first display;
    displaying a preset image data instead of the image data contained in the indicated image file in the first display area if the indication information is not designated for the first display;
    determining whether the indicated image file on the list is designated as an image file settable as a background screen image for the second display;
    determining whether a protection function is set for the indicated image file on the list if the indication information is designated for the second display;
    displaying the image data contained in the indicated image file on the second display and the second display area, respectively if the protection function is not set;
    displaying the image data contained in the indicated image file on the second display area if the protection function is set; and
    displaying a different image data instead of the image data contained in the indicated image file on the second display if the protection function is set,
    wherein the different image data is contained in an image file where the indicator was just previously located.

2. The method of claim 1, further comprising:
    designating the image files to constitute the list in response to a selection signal from a user.

3. The method of claim 1, further comprising:
    displaying a list of image files settable as a background screen image of the first display in a third display area, and
    displaying a list of image files settable as the background screen image of the second display in a fourth display area.

4. A mobile terminal comprising:
    a storage unit;
    a first display having a plurality of display areas including a first display area and a second display area, the first display located on a front side of a body of the terminal and the first display displays information that is provided to only a user of the terminal;
    a second display located on a rear side of the body of the terminal;
    a controller configured to display a list of image files settable as a background screen image of one of the first display and the second display, on the first display if a mode for setting the background screen image of one of the first display and the second display is entered, the image files being stored in the storage unit; and
    an indicator configured to indicate one of the image files on the list,
    the controller further configured to:
    display an indication information whether each image file on the list is designated as an image file settable as a background screen image of one of the first display and the second display, at the end of the name of each image file on the list;

move an indicator to indicate one of the image files on the list;

determine whether the indicated image file on the list is designated as an image file settable as a background screen image for the first display;

display an image data contained in the indicated image file in the first display area if the indication information is designated for the first display;

display a preset image data instead of the image data contained in the indicated image file in the first display area if the indication information is not designated for the first display;

determine whether the indicated image file on the list is designated as an image file settable as a background screen image for the second display;

determine whether a protection function is set for the indicated image file on the list if the indication information is designated for the second display;

display the image data contained in the indicated image file on the second display and the second display area, respectively if the protection function is not set;

display the image data contained in the indicated image file on the second display area if the protection function is set; and display a different image data instead of the image data contained in the indicated image file on the second display if the protection function is set, wherein the different image data is contained in an image file where the indicator was just previously located.

* * * * *